United States Patent
Nygaard

(10) Patent No.: US 8,723,068 B2
(45) Date of Patent: May 13, 2014

(54) METHOD AND SYSTEM FOR OPTICALLY INSPECTING MANUFACTURED ROUNDS OF AMMUNITION OR CYLINDRICAL COMPONENTS OF THE ROUNDS TO OBTAIN ROUNDS WHICH EXHIBIT SUPERIOR ACCURACY WHEN FIRED

(76) Inventor: Michael G. Nygaard, Fenton, MI (US)

( * ) Notice: Subject to any disclaimer, the term of this patent is extended or adjusted under 35 U.S.C. 154(b) by 376 days.

(21) Appl. No.: 13/227,786

(22) Filed: Sep. 8, 2011

(65) Prior Publication Data

US 2013/0062262 A1 Mar. 14, 2013

(51) Int. Cl.
*B07C 5/00* (2006.01)

(52) U.S. Cl.
USPC ......................................................... 209/586

(58) Field of Classification Search
USPC .......... 209/552, 576, 586; 356/625, 635, 639, 356/640
See application file for complete search history.

(56) References Cited

U.S. PATENT DOCUMENTS

| | | | |
|---|---|---|---|
| 2,422,036 A * | 6/1947 | Oakley | 209/555 |
| 3,924,953 A | 12/1975 | Allard | |
| 4,315,688 A | 2/1982 | Pryor | |
| 4,598,998 A | 7/1986 | Kamei et al. | |
| 4,644,394 A | 2/1987 | Reeves | |
| 4,721,388 A | 1/1988 | Takagi et al. | |
| 4,831,251 A | 5/1989 | Hanna | |
| 4,852,983 A | 8/1989 | Fein | |
| 4,906,098 A | 3/1990 | Thomas et al. | |
| 4,918,825 A | 4/1990 | Lesh et al. | |
| 4,923,066 A | 5/1990 | Ophir et al. | |
| 4,969,746 A | 11/1990 | McConnell et al. | |
| 4,983,043 A | 1/1991 | Harding | |
| 5,012,117 A | 4/1991 | Karafa et al. | |
| 5,164,995 A | 11/1992 | Brooks et al. | |
| 5,291,272 A | 3/1994 | Demirsu | |
| 5,301,436 A | 4/1994 | Johnston | |
| 5,521,707 A | 5/1996 | Castore et al. | |
| 5,570,513 A | 11/1996 | Peterson | |

(Continued)

FOREIGN PATENT DOCUMENTS

| | | |
|---|---|---|
| JP | 3879007 B2 | 2/2007 |
| WO | 2005022076 A2 | 3/2005 |
| WO | 2009130062 A1 | 10/2009 |

OTHER PUBLICATIONS

International Search Report and Written Opinion; International application No. PCT/US2012/051683; date of mailing Jun. 19, 2013.

*Primary Examiner* — Joseph C Rodriguez
(74) *Attorney, Agent, or Firm* — Brooks Kushman P.C.

(57) ABSTRACT

A method and system for optically inspecting manufactured rounds of ammunition or cylindrical components of the rounds to obtain rounds which exhibit superior accuracy when fired are provided. The method includes providing a nominal numerical value and an acceptable range of numerical values for a size or a geometric characteristic of an acceptable manufactured round of ammunition or a cylindrical component of the round for a predetermined caliber of ammunition. Also provided is a high-performance range of numerical values for the corresponding size or geometric characteristic of a high-performance manufactured round of ammunition or a cylindrical component of the high-performance round for the predetermined caliber of ammunition. A generated signal identifies the inspected round or a round including the inspected cylindrical component as having superior accuracy when fired relative to acceptable inspected rounds or inspected cylindrical components having a corresponding measured value which is outside the high-performance range but within the acceptable range of numerical values.

18 Claims, 6 Drawing Sheets

(56) References Cited

U.S. PATENT DOCUMENTS

| | | |
|---|---|---|
| 5,608,530 A | 3/1997 | Gates |
| 5,646,724 A | 7/1997 | Hershline |
| 6,055,329 A | 4/2000 | Mufti |
| 6,397,720 B1 | 6/2002 | Fox et al. |
| 6,708,071 B1 | 3/2004 | Turner |
| 6,718,645 B2 | 4/2004 | Berger |
| 6,959,108 B1 | 10/2005 | Bartelt et al. |
| 7,312,607 B2 | 12/2007 | Nygaard |
| 7,403,872 B1 | 7/2008 | St. Onge et al. |
| 7,565,216 B2 | 7/2009 | Soucy |
| 7,633,046 B2 | 12/2009 | Spalding |
| 7,633,634 B2 | 12/2009 | Spalding et al. |
| 7,633,635 B2 | 12/2009 | Nygaard et al. |
| 7,684,054 B2 | 3/2010 | Crowther |
| 7,716,845 B1 | 5/2010 | Willis |
| 7,738,088 B2 | 6/2010 | Spalding |
| 7,738,121 B2 | 6/2010 | Spalding |
| 7,755,754 B2 | 7/2010 | Spalding |
| 7,777,900 B2 | 8/2010 | Nygaard et al. |
| 7,796,278 B2 | 9/2010 | Spalding et al. |
| 7,812,970 B2 | 10/2010 | Nygaard |
| 8,004,694 B2 | 8/2011 | Lee et al. |
| 8,570,504 B2 * | 10/2013 | Nygaard .................... 356/237.1 |
| 2005/0226489 A1 | 10/2005 | Beach et al. |
| 2006/0248739 A1 | 11/2006 | Cauley |
| 2010/0201806 A1 | 8/2010 | Nygaard et al. |
| 2012/0012509 A1 * | 1/2012 | Spence, Jr. ................ 209/682 |
| 2012/0048785 A1 * | 3/2012 | Green ......................... 209/682 |

* cited by examiner

METHOD AND SYSTEM FOR OPTICALLY INSPECTING MANUFACTURED ROUNDS OF AMMUNITION OR CYLINDRICAL COMPONENTS OF THE ROUNDS TO OBTAIN ROUNDS WHICH EXHIBIT SUPERIOR ACCURACY WHEN FIRED

CROSS-REFERENCE TO RELATED APPLICATION

This application is related to U.S. patent application Ser. No. 13/090,314 filed Apr. 20, 2011.

TECHNICAL FIELD

This invention relates in general to the field of non-contact, automatic inspection of rounds of ammunition or cylindrical components of the rounds and, more particularly, to methods and systems for optically inspecting such parts to obtain rounds which exhibit superior accuracy when fired.

BACKGROUND

Traditional manual, gauging devices and techniques for parts such as rounds of ammunition and cylindrical components of such rounds have been replaced to some extent by automatic inspection methods and systems as illustrated in U.S. Pat. Nos. 4,923,066; 6,959,108; 7,403,872; and 8,004,694. However, many manual gauging devices and techniques are still used despite having a number of shortcomings associated with them. U.S. Pat. Nos. 4,918,825; 5,301,436; 5,570,513; 6,397,720; 6,718,645; 7,403,872; and 7,716,845 discloses such devices and techniques.

A round of ammunition (often synonymously termed a "bullet" or a "cartridge") normally includes a case which includes a primer, a quantity of powder contained within the case, and a projectile held in the open end of the case. Upon the striking of the primer by the firing pin of the weapon there is generated a flame which serves to ignite the powder within the case, generating gases which expand and propel the projectile from the muzzle of the weapon. Normally, the case is geometrically shaped and sized to be contained within the chamber of the weapon, and the projectile has dimensions which allows it to fit in the breech end of the barrel, and to eventually pass through the barrel upon firing of the round. For many rifles, for example, it is common to make the case of the round of ammunition of a size which will provide for the maximumization of the force with which the projectile is propelled from the weapon to the target. Thus, it is common, for a round for a given caliber weapon, to employ a case which will contain a maximum amount of powder, hence the case has a large diameter relative to the diameter of the projectile employed. This case then becomes the "standard" case for a particular caliber weapon and weapons of this caliber are chambered to accept this standard case. Standards for the shape and size of a cartridge for a given weapon, e.g. a rifle, of a given caliber are established and published by Sporting Arms and Ammunition Manufacturers Institute (SAAMI), as well as by NATO.

The overall length (i.e. OAL) of an ammunition cartridge is a measurement from the base of the shell casing to the tip of the bullet, seated into the casing.

Handloaded cartridges and commercially available cartridges for firearms are normally created with a maximum length standardized by SAAMI. A cartridge's overall length may be shorter than the maximum standard, equal to the standard, or sometimes even longer.

The maximum overall length is dictated by the need to fit into a box magazine of standard manufacture. For example, the 0.223 Remington cartridge, when loaded for use in the semi-automatic AR-15 rifle (or the military's M-16 rifle), has to fit into the removable box magazine for that rifle. This dictates that the cartridge's maximum overall length be no greater than 2.260". However, for competition purposes during off-hand and slow fire prone match stages, the 0.223 Remington is loaded one cartridge at a time into the rifle's receiver. This allows for the cartridge to be longer than the standardized 2.260" SAAMI maximum overall length. These cartridges can be safely loaded to a length that has the ogive portion of the bullet just touching the rifle's lands. Many competitive shooters will make these cartridges 0.005" less than the truly maximum allowable overall length, for the sake of safety.

It is desirable for these single-loaded cartridges to have as little bullet jump as possible before the bullet's ogive begins to be engraved by the rifle's lands. This minimized bullet jump increases the accuracy of the rifle, all else being equal.

For some cartridges, headspace is measured from the face of the closed bolt of the firearm to a point where a circle of a certain size, called a datum circle, would intersect the cone of the shoulder on the chamber. FIG. 2 depicts a prior art headspace gauge, as shown in U.S. Pat. No. 7,716,845.

Variation of headspace of either sense can create significant problems. For example if the chamber headspace is not large enough the bolt will not then close completely on a rifle, automatic pistol, or shotgun cartridge.

The cartridge headspace may be found too great in some cases because the cartridge has been stretched (in the case of reloads) by firing it in a gun that had excess headspace. If the casing is then reloaded without full length re-sizing and an attempt is made to use it in a gun with tight headspace, it may be found impossible to close the bolt.

If there is excess headspace in a gun there may be ignition trouble (misfires or hang fires) because the firing pin may not be able to give the primer a proper blow. Also accuracy may be diminished with excess headspace.

Eccentricity of a projectile with respect to its case exceeding 0.025 mm may cause a deterioration of the firing precision that increases with the eccentricity. In this context, the eccentricity is defined as the angle between the longitudinal axis of the projectile and the case. Ideally, i.e. in the case of perfect concentricity, this angle is equal to zero.

As a practical matter, commercially available ammunition or ammunition components, like casings, bullets, primers, and propellant, are all made within certain tolerances set by their manufacturers. Therefore, while these components may be within the manufacturing tolerance, some of the components may be near the optimal specification while others may be very close to the outside tolerance.

For example, cartridge castings are optimally cylindrical in shape. Thus, if one imagines a longitudinal axis passing through the center of casing from the head of the casting extending out of the mouth of the casing, a cross-section of the casing taken anywhere along the axis, perpendicularly to the axis, would reveal that the axis is in the center of a circle, if the casing is optimally shaped. That is, the wall of the casing is "concentric." However, perfect concentricity is rare; casings, bullets, and cartridges may exhibit one or more eccentricities. Thus, casings may be produced which have a "thin" side or a "thick" side, or bullets may be produced which deviate from a perfectly circular cross-section to produce a "high" area where two halves of a mold are joined. Such variations from the optimum are called "eccentricities." One must consider the eccentricities if accuracy in shooting is to be attained.

"Runout" is a term which is soften used to describe eccentricities which affect the outer (external) surface of a cartridge casing, bullet, or other generally cylindrical object. Runout is a deviation from the midline axis (also known as the central longitudinal axis or the geometric axis) of the outside surface of a cylinder. For example, cartridge casing "runout" can involve a "banana shape" curve in which the casing is not a perfectly straight cylinder, but bends longitudinally. With this kind of runout, each cross-section may be perfectly circular, but eccentric or offset relative to the geometrical axis of the cartridge as a whole. "Banana shape" runout may be seen in fired cartridge casings (which are commonly cleaned, resized and reloaded), and typically becomes more pronounced with every firing.

"Egg-shape," or out-of-round runout occurs when one transverse cross-section of a casing, bullet or cartridge is not circular. This eccentricity is typically local, and may occur at any one cross-section independently of its occurrence at any other cross-section. Having found egg shape at one point, one cannot predict what various degrees, shapes or orientation of deformity might be found elsewhere.

Head runout occurs when the head on a casing is not "square." This condition occurs when the head of the casing (or more commonly, a portion of the head of the casing) is not perpendicular to the central longitudinal axis of the casing.

Yet another troublesome eccentricity occurs when the casing wall thickness is not uniform. When this occurs, a portion of the casing wall is thinner. Because the outer surface of the casing may be uniform, checking for runout will not reliably determine variations in casing wall thickness. If the casing is thinner in a certain area, that section of the wall may unevenly stretch upon firing in both width and length, and the whole casing may, after several uses, be distorted into a banana-like shape.

All of these eccentricities affect accuracy in shooting. With runout, the bullet can be misaligned off axis in the bore when the cartridge is chambered in the firearm. If the casing thickness varies, for example in the neck region where the bullet is lodged, the bullet can be laterally offset and again may be positioned in the bore off axis from the optimum position when chambered. As noted above, very small errors will spread the bullet trajectories. For accurate shooting, the casing, bullet and loaded cartridge should be true within 0.001 inch or less. FIG. 1 depicts a prior art cartridge runout fixture including a dial indicator gauge as shown in U.S. Pat. No. 5,301,436.

WO 2009/130062 discloses a method and a device for the optical viewing of objects and WO 2005/022076 discloses a part inspection apparatus using light line generators.

Other U.S. patent documents related to the invention include: U.S. Pat. Nos. 4,315,688; 4,598,998; 4,644,394; 4,831,251; 4,852,983; 4,906,098; 5,521,707; 5,608,530; 5,646,724; 5,291,272; 6,055,329; 6,708,071; 6,959,108; 4,983,043; 3,924,953; 5,164,995; 4,721,388; 4,969,746; 5,012,117; 7,684,054; 7,403,872; 7,633,635; 7,312,607; 7,565,216; 7,777,900; 7,633,046; 7,633,634; 7,738,121; 7,755,754; 7,738,088; 7,796,278; 7,684,054; and 7,812,970; and, U.S. published patent applications 2006/0248739 and 2010/0201806.

SUMMARY

In a method embodiment, a method of optically inspecting manufactured rounds of ammunition or cylindrical components of the rounds to obtain rounds which exhibit superior accuracy when fired is provided. The method includes providing a nominal numerical value and an acceptable range of numerical values for a size or a geometric characteristic of an acceptable manufactured round of ammunition or a cylindrical component of the round for a predetermined caliber of ammunition. The method also includes providing a high-performance range of numerical values for the corresponding size or geometric characteristic of a high-performance manufactured round of ammunition or a cylindrical component of the high-performance round for the predetermined caliber. The method further includes optically gauging the size or geometric characteristic of a manufactured round of ammunition or cylindrical component of the round for the predetermined caliber at a vision station to obtain a measured value for the corresponding size or characteristic. The method still further includes determining whether the measured value is within the high-performance range of numerical values. The method further includes generating a signal if the measured value is within the high-performance range. The signal identifies the inspected round or a round including the inspected cylindrical component as having superior accuracy when fired relative to acceptable inspected rounds or inspected cylindrical components having a corresponding measured value which is outside the high-performance range but within the acceptable range of numerical values.

The high-performance range may at least partially be included within the acceptable range.

The size may be overall length (OAL) of the round.

The size may be headspace of the round.

The geometric characteristic may be concentricity of a projectile of the round with respect to a case body of a cartridge holding the projectile.

The geometric characteristic may be runout.

The nominal numerical value and acceptable range of numerical values may be standardized.

The nominal numerical value and the acceptable range of numerical values may be standardized by SAAMI or NATO.

The method may further include transferring the inspected round or inspected cylindrical component from the vision station to a high-performance round or cylindrical component area based on the signal.

In a system embodiment, a system for optically inspecting manufactured rounds of ammunition or cylindrical components of the rounds to obtain rounds which exhibit superior accuracy when fired is provided. The system includes storage to store a nominal numerical value and an acceptable range of numerical values for a size or a geometric characteristic of an acceptable manufactured round of ammunition or a cylindrical component of the round for a predetermined caliber of ammunition. The storage also stores a high-performance range of numerical values for the corresponding size or geometric characteristic of a high-performance manufactured round of ammunition or a cylindrical component of the high-performance round. The system further includes an optical subsystem coupled to the storage to optically gauge the size or geometric characteristic of a manufactured round of ammunition or cylindrical component of the round for the predetermined caliber at a vision station to obtain a measured value for the corresponding size or characteristic. The subsystem also determines whether the measured value is within the high-performance range of numerical values. The subsystem further generates a signal if the measured value is within the high-performance range. The signal identifies the inspected round or a round including the inspected cylindrical component as having superior accuracy when fired relative to acceptable inspected rounds or inspected cylindrical components having a corresponding measured value which is outside the high-performance range but within the acceptable range of numerical values.

The system may further include a mechanism to transfer the inspected round or inspected cylindrical component from the vision station to a high-performance round or cylindrical component area based on the signal.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is made to the following description taken in conjunction with the accompanying drawings, in which.

DETAILED DESCRIPTION

Figure 1:
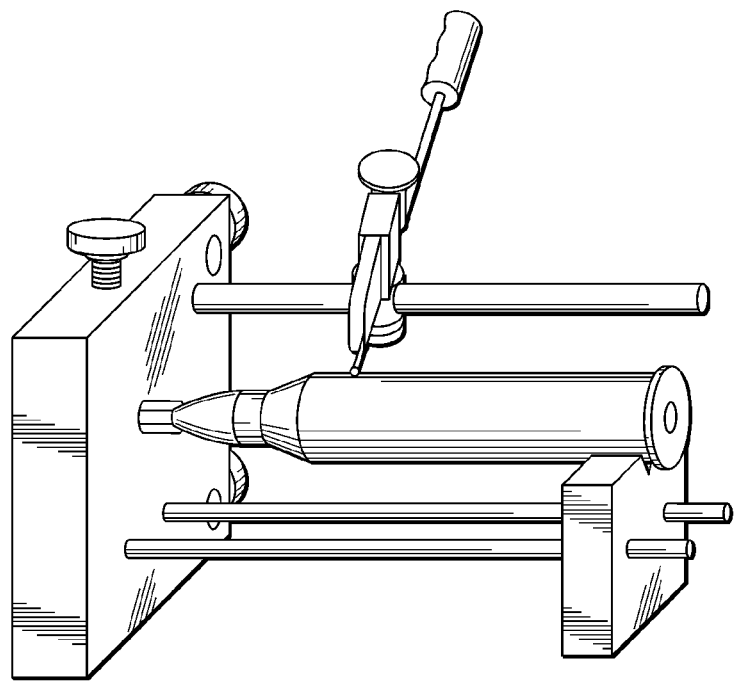
FIG. 1 is a schematic perspective view of a prior art manual cartridge runout gauging device.
Figure 2:
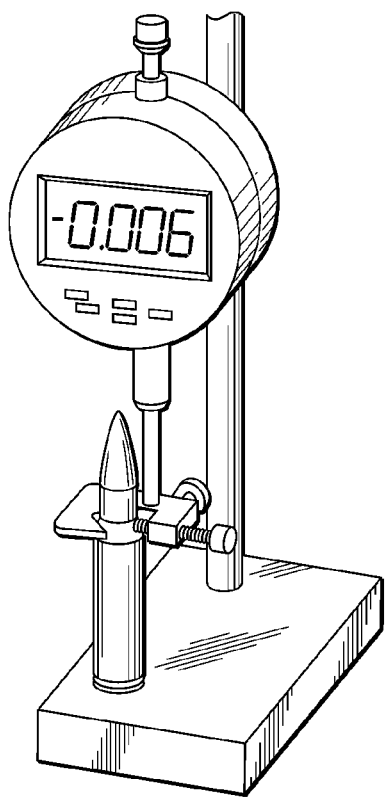
FIG. 2 is a schematic perspective view of a prior art manual headspace gauging device.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, one embodiment of the method and system of the present invention optically gauges manufactured parts such as rounds of ammunition as well as cartridges and cartridge cases illustrated in the drawing figures and allows the inspected parts to be sorted depending on the desired firing accuracy of the inspected parts. The system may be a complete system designed for the inspection and sorting of various caliber ammunition. However, the system is also suitable for other small, mass-produced manufactured parts. The subsystems which may be used for part holding, handling and delivery may vary widely from application to application depending on part size and shape.

One embodiment of an overall system or subsystem described in this application is referred to as "LaserLab." LaserLab is a trademark of the assignee of U.S. Pat. No. 7,796,278. LaserLab does at least one thing very well: it quickly and accurately measure all external characteristics on a manufactured cylindrical part. U.S. Pat. No. 7,796,278 is hereby incorporated by reference herein. The goal of at least one embodiment of this invention was to find a way to use the information available from the LaserLab to learn something about (i.e. measure) a limited number of specific sizes (i.e. dimensions) and/or characteristics of a round of ammunition or a component of a round of ammunition which affects accuracy when the round of ammunition is fired. Such sizes and characteristics include but are not limited to OAL, headspace and round eccentricities such as runout. After one or more measurement feature (i.e. size) or characteristic is determined, the inspected round or components thereof are sorted for accuracy. In this way, inspected rounds or components thereof are typically sorted into "high-performance," "acceptable" and "reject" areas or bins instead of the conventional "acceptable" and "reject" areas or bins.

LaserLab—Physical Overview

The LaserLab system or subsystem (i.e. FIGS. 3 and 4) includes several physical subsystems or units as described in U.S. Pat. No. 7,796,278.

A PC tower unit (i.e. FIG. 4) contains a computer and a number of additional control electronics modules. It has a rear panel with connectors for light curtain/safety electronics, motor control, linear encoder, measurement signals, and optical head control. The PC tower unit hosts the application program which presents a user interface to an operator of the LaserLab system.

Although at least one embodiment of the present invention was motivated by the needs of the ammunition industry, there are other examples of manufactured parts, such as high performance cylindrical threaded parts or fasteners, which can take advantage of the present invention. Throughout the discussions below, it is assumed that the part being measured is round, and the tooling that interfaces with this part are therefore described as being conical. If the part contains a recess with a different shape (hexagonal for example), a tooling set with a different cross-section can be used. The concept of the invention is otherwise unchanged.

Part holder and upper tooling units (FIG. 3) secure or receive and retain a part, such as a round of ammunition or an ammunition case, in place for measurement. The upper tooling unit typically includes a stainless steel rod with a spring loaded upper holding device that can move up and down to accommodate a wide variety of part sizes. The part holder unit has a base to support a lower holding device and its held part or unit under test and a calibration device. The calibration cone or device is used to measure the relationship between a light sensor output and the physical measurements represented by the outline dimensions of the cone. The calibration cone or device is not strictly speaking a cone but rather includes a number of frustums (i.e., portions of cones) and cylinders.

An optical head (FIG. 3) is a sealed system containing a number of components including optical measurement components. A set of four laser beam lines generate and measure four planes of light.

A slide/base unit (i.e. FIG. 3) moves the optical head vertically up and down to make part and holding device measurements. On every scan the optical head's eight sensors measure shadow images of the calibration cone, the part and the holding devices. Each complete scan thus contains both calibration data and measurement data, yielding a system that is especially unaffected by time variations in measurement conditions.

Figure 3:
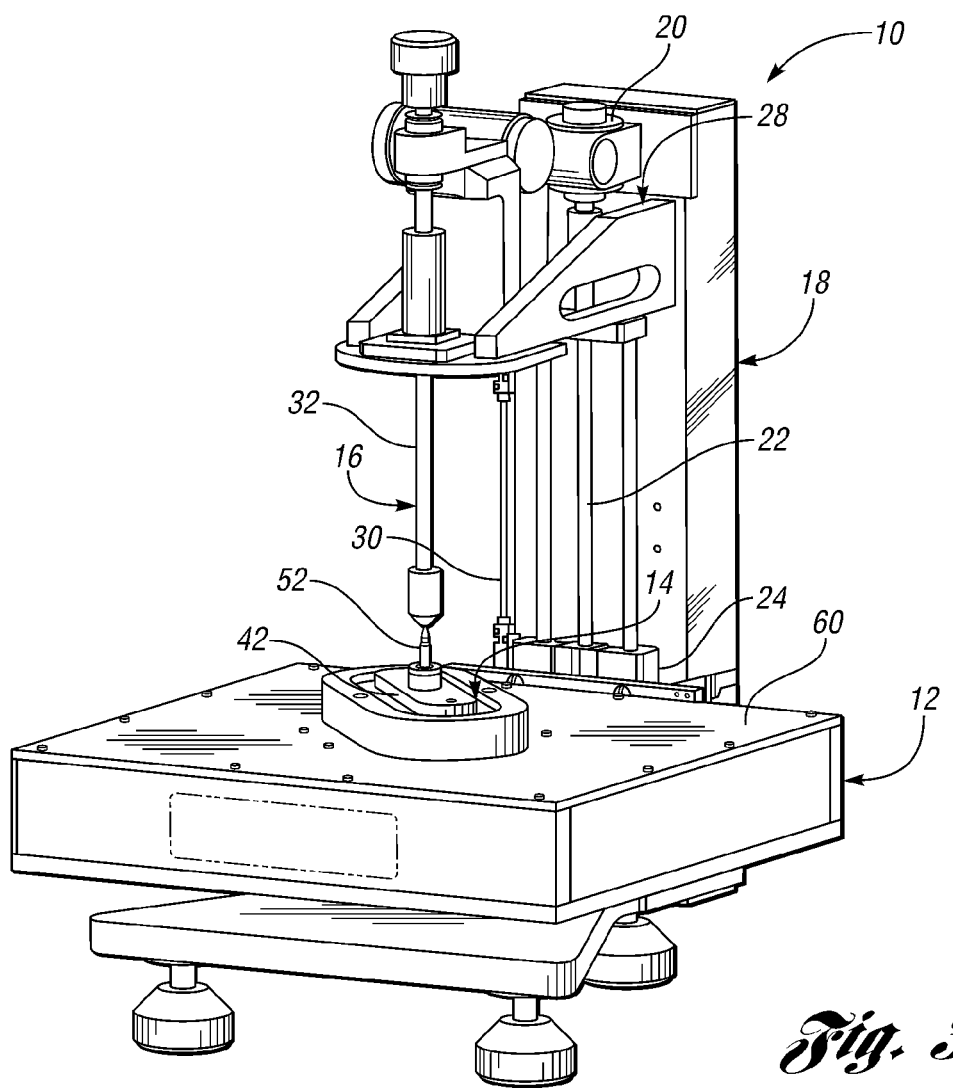
FIG. 3 is a schematic perspective view of an optical inspection system or subsystem constructed in accordance with one embodiment of the present invention.

Referring again to the drawing figures, FIG. 3 is a schematic perspective view of the LaserLab system, generally indicated at 10, including the basic measurement hardware of the system 10. Shown are the optical head, generally indicated at 12, the part holder/upper tooling units, generally indicated at 14 and 16, respectively, and the base/slide unit, generally indicated at 18, which includes a motor 20 coupled to a lead screw 22 which, in turn, is coupled to a saddle 24 slidably supported by a bearing. The saddle 24 is coupled to the optical head 12 to move the optical head 12 linearly along a vertical stage axis 28. Movement of the stage is sensed by a linear encoder 30.

Multiple Beam Optical Head

Figure 4:
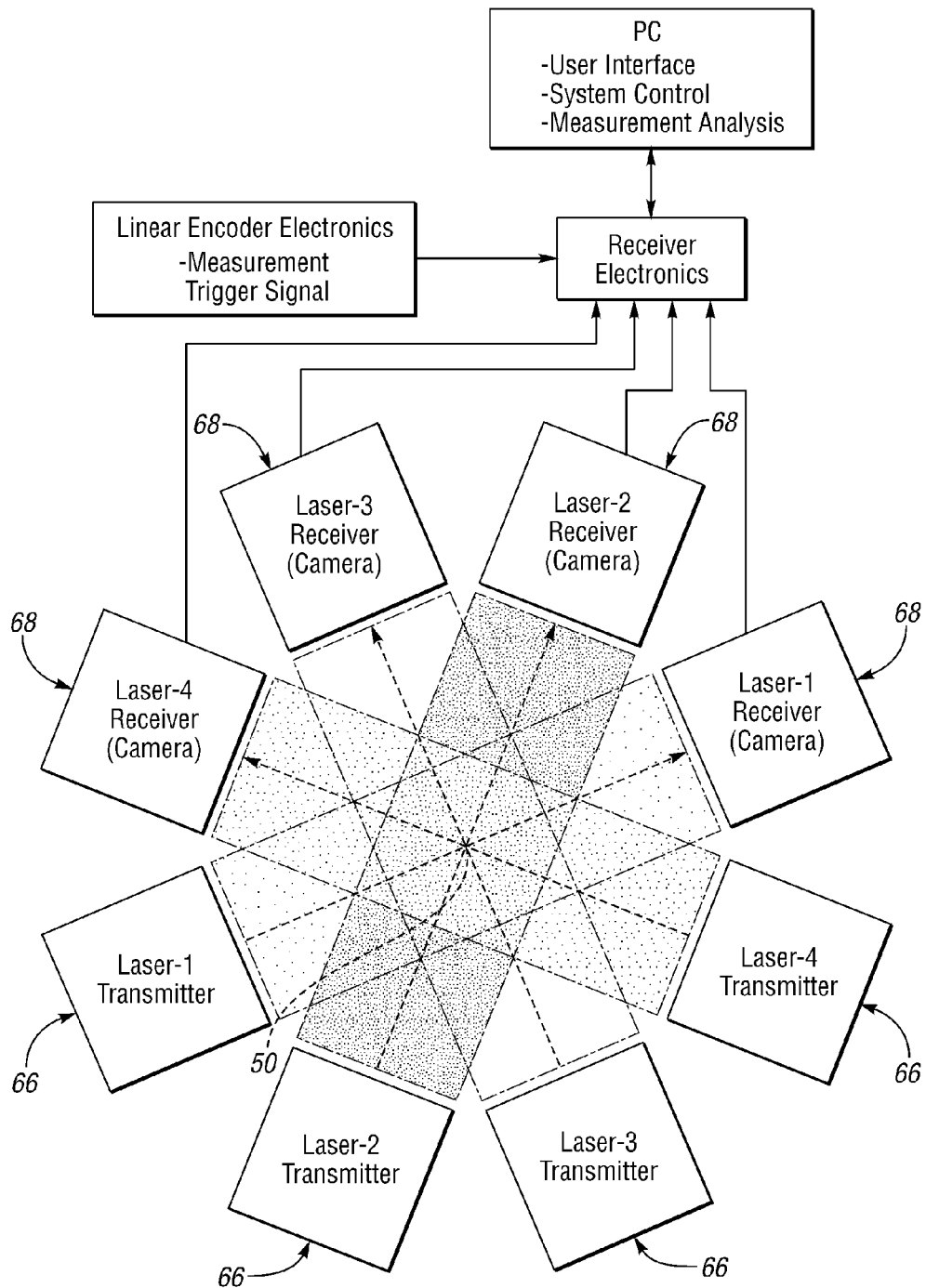
FIG. 4 is a schematic block diagram of various laser light transmitters and corresponding receivers or cameras which can be contained within an optical head of the system of FIG. 3 or which can be stationary with respect to the round of ammunition or a cylindrical component of the round moving along a gravity feed track or on a conveyor to provide relative motion between the part and the hardware of the system.

The optical head 12 contains four beam line subsystems. The subsystems are aligned on a common central axis. Looking directly down on the optical head 12 the beam line light plane split lines preferably intersect at a common point 50 of an axis of the part 52 as shown in FIG. 4. The angles of the beam lines, relative to the front of the optical head base plate, are 22.5, 67.5, 112.5, and 157.5 degrees.

This arrangement, combined with the mechanical scanning of the light planes, results in eight outline images of the part 52, one per sensor. As previously mentioned, the part 52 may be a round of ammunition or a component of the round of ammunition.

FIG. 4 is a top plan schematic view of laser light transmitters or modules 66 and laser receiver or camera modules 68 of the optical head 12 with its top plate 60 removed. The laser split line for each transmitter module 66 is indicated as a dashed ray which has an arrow head which illustrates the direction of travel of the light beam and the plane of laser light. FIG. 4 also represents an embodiment of the invention where a part, such as the part 52, moves linearly along its axis and the transmitter 66 and the receivers 68 are stationary. As described below, the part 52 may move along a track or may move with a conveyor with the transmitters 66 and the receivers 68 located about the track or conveyor at different azimuthal positions.

Figure 5:
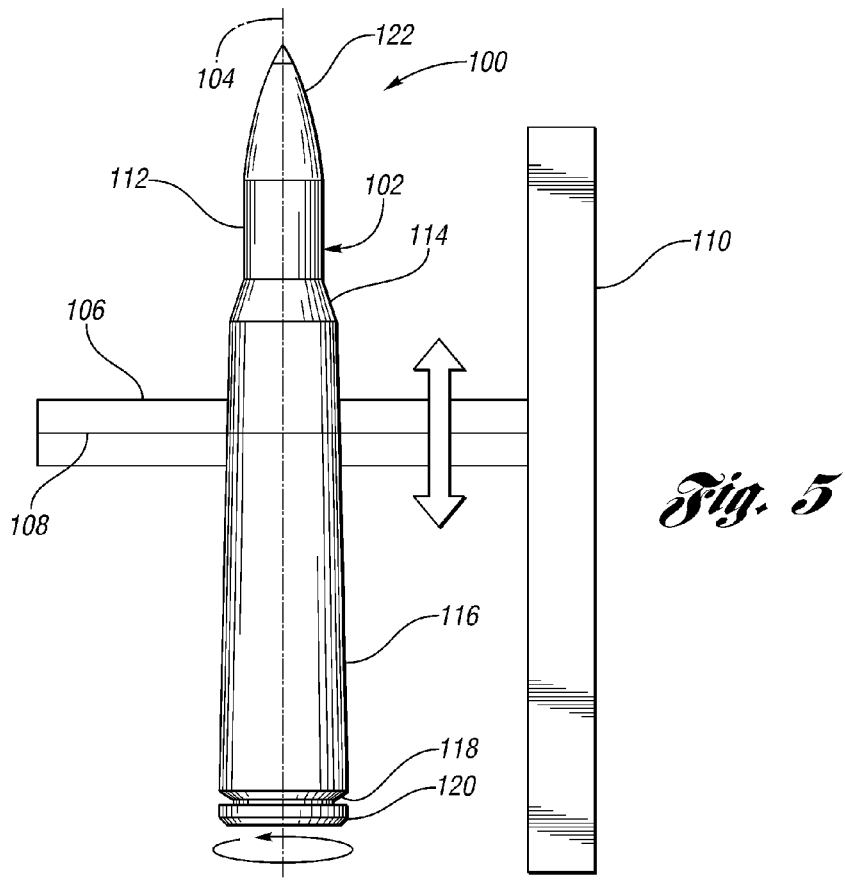
FIG. 5 is a simplified schematic view of an optical inspection system or subsystem constructed in accordance with another embodiment of the present invention wherein the round of ammunition is rotatable and the round is scanned along its length.

FIG. 5 is a drawing which illustrates a second embodiment of the invention which is described in detail in U.S. Pat. No. 7,684,054 which is also incorporated herein. A part, such as a round of ammunition, generally indicated at 100, is inspected. The round 100 includes a cartridge case 102 (which may be inspected before it forms part of the round 100 of ammunition) is placed in a rotatable fixture allowing the round 100 to be rotated about axis 104. Behind the round 100 is a bright, horizontally oriented light source 106 and in front of the round 100 is a horizontally oriented light detector 108. This is a highly simplified drawing, such that details of the light source, detector and other features are not illustrated for the purposes of clarity, or are any of the enclosures that would be used for most of the rounds or components thereof.

The cartridge case 102 may include a neck 112, a taper 114, a case portion 116, a groove 118, and a head 120. A projectile or bullet 122 of the round 100 is held in the open end of the case's neck 112.

The light source 106 and detector 108 are physically coupled to one another, such that they move as a unit up and down along the axis 104 of the round 100. This is accomplished by connecting the light source and detector to a column 110, including a translation mechanism and linear encoder for precise movement. In this embodiment, the light source and detector may move in fixed increments of 1 micron, though this is adjustable.

The light source 106 is of a high intensity, creating a bright field and an image on the detector 108 which is extremely high in contrast. With such an arrangement, the light-sensing elements of the detector 108 essentially see white where the light is able to pass by the round 100, and dark or black where the component blocks the light reaching the detector 108. The elements of the detector 108 are coupled to a processor (not shown) which receives the profile information for each up/down increment of the light source 106 and the detector 108 as they move. The various readings are compiled, providing for an accurate profile of the round 100 at a particular orientation. Once the length of the round 100 is scanned as desired or necessary, the round 100 is rotated about axis 104, and the process is repeated. The angle through which the round 100 is rotated is preferably user controllable, though a total rotation of 180° as opposed to 360° is sufficient, since the detector 108 need not look at the "backside" of the round 100.

According to this embodiment of the invention, the detector 108 may be comprised of a linear set of sensor elements, each element being positioned at a known, fixed distance relative to the overall set. As these dimensions are known, the profile and other characteristics of the round 100, including diameter and other features, may be precisely measured and stored through appropriate calibration. The detector 108 may be implemented utilizing a line-scan camera. Also, the line-scan camera may be simulated using a two-dimensional image sensor.

Since the detector elements of most two-dimensional image sensors are grouped in a plurality of lines, a number of rows of pixels are used during each up/down increment. For example, if 16 lines are coupled to one another in the image sensor, the stage 110 is directed under computer control to move up or down at a distance calibrated to the 16 lines of the sensor. Again, since the distance between rows of pixels on the image sensor is known in advance, it is a straightforward calibration procedure to increment the light source 106 and detector 108 by any given number of rows per increment. This embodiment of the invention is not limited in terms of the length of the round or part, so long as it fits into the machine and the translator 110 is able to move the light source 106 and detector 108 along the length of the part.

Given the versatility of the system and method, the scanning process may utilize multiple, distinct scanning processes. For example, in addition to the linear scan just described (set angle, variable position along the round axis), a rotational scan may be used with a set linear position and a variable angle. This can be used for any local analysis requiring significantly more data than the ones given by the somewhat limited number of planes available through the linear scan. As with the first embodiment of FIGS. 3 and 4 (as well as the third embodiment of FIG. 6), checking for roundness or concentricity for instance would typically require 4 planes which the user may not necessarily want for the rest of the inspection. Use of the rotational scan allows for the acquisition of more data to perform a roundness or concentricity analysis. Additionally, the combination of the four complete part profiles can be combined to generate an approximate three-dimensional part shape which can be used to extract part bend and eccentricity information.

These different scan modalities may be used separately, together, and/or repeated as desired. For example, a complete scan process (linear+rotational) may be repeated several times, (i.e. "observations").

The width of the light source 106 may be physically matched to the detector elements 108. This may be done with a light source formed from a linear row of surface-mount high-brightness-emitting diodes, with an overall length on the order of 2 inches. The width of the rows of pixels on the image sensor are also on the order of 2 inches, such that, in essence, a plane of light emerges from the light source 106, past the round 100 or component 102, and on to the image sensor or detector 108.

A light source 106 in the form of a line of LEDs has advantages and disadvantages. LEDs are relatively inexpensive, compact and easy to implement, but the light is not collimated. This means that the outer edges LEDs can create reflections on the part if it shiny. This problem may be resolved by implementing a line-generated laser lighting scheme (collimated in nature), but is bulkier and more expensive.

An advantage of at least one embodiment of the invention is that neither the round 100 nor the component 102 need not be perfectly centered in the inspection plane in order to measure features, such as part diameter. Since the light source and detector are laterally fixed as they move up or down, the profile of the part may be registered to one end of the detector, measurements being normalized regardless of minor variances. This embodiment of the invention not only measures the width of the part in the area of inspection but also its location in the field of view with respect to one end of the detector. According to at least one embodiment of the instant invention, however, since measurements are referenced to one end of the detector, accurate details may be determined following a sufficient number of angular displacements. For instance, some features may only be detected by the oscillation of its edges versus the angular displacement, while displaying a constant width.

This embodiment of the invention can also measure rounds of ammunition or components of such rounds having diameters that change dramatically from end to another. Components that are bent may also be examined. A distinct advantage of the physical measurement process described here is that it not only directly measures a length (or diameter) but also its horizontal location in the inspection plane. This is particularly important in the case of some parts since at any given angle the diameters are equal. The only tell-tell sign of certain features is its horizontal "wobble," which this invention takes into account.

Figure 6:
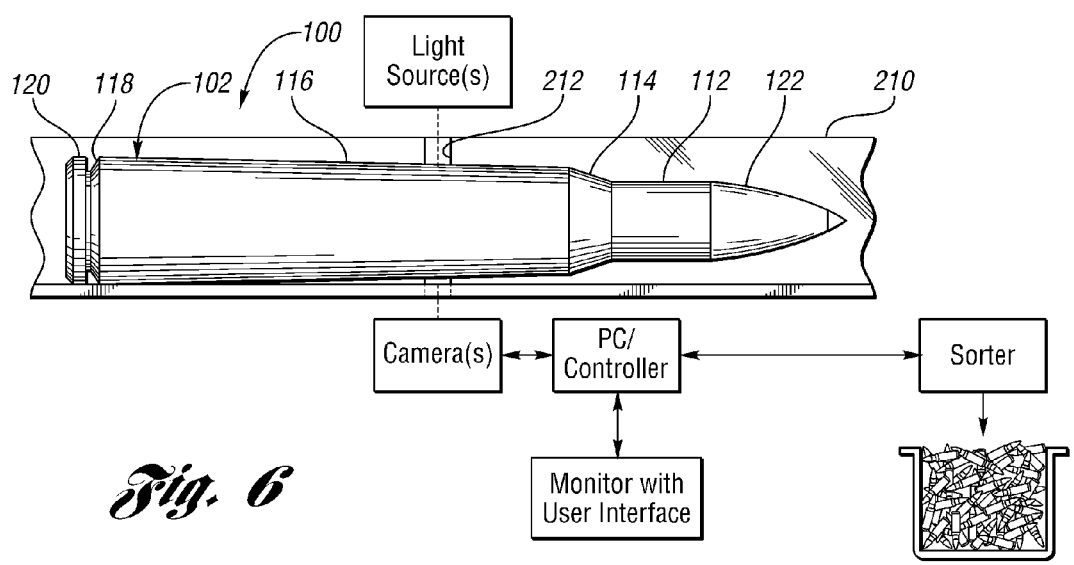
FIG. 6 is a simplified top schematic view of an optical inspection system or subsystem with a round of ammunition moving down a V-shaped track having a separation to allow one or more planes of radiation or light projected by source(s) to be detected by one or more detectors or cameras positioned on the opposite side of the track so as to scan the round as it moves along the track.

An embodiment of the invention is also applicable to both 100% inspection and sorting operations which is described in detail in U.S. Pat. No. 7,403,872. Reference is made to FIG. 6 which shows, respectively, the round 100 moving down a V-shaped track 210 having a separation 212, allowing one or more light sources and one or more detectors or cameras to be positioned to scan the round 100 as it moves along the track 210. The velocity of the component can be measured optically. Although the gap or separation 212 in the track 210 may cause the part to move or vibrate, a continuous track which is light-permeable may be used according to the invention. Alternatively, the round 100 (or case 102 without the bullet 122) may be positioned on a conveyor (not shown) to move between the light source(s) and their corresponding detector(s) or camera(s).

Also according to the embodiment of FIG. 5, if sufficient profiles are taken along an adequate number of angular rotations, interpolation or other forms of "morphing" algorithms may be used to estimate component geometry in between the actually measured profiles, thereby allowing a three-dimensional model of the part to be created. With this data, the use of a computer aided design program may be used to view a round or component from different angles, rotate, flip, magnify and perform other operations on the part seen on a computer screen of the system. Also the inspected part 3D model can be compared to the 3D design model and geometric and dimensional differences can be highlighted using a color scale proportional to the dimensional difference.

A variety of chucks may be used to hold parts (i.e. rounds of ammunition or components of the rounds) for rotational purposes. A lower chuck may include a shaped well into which the head of the round fits. Similarly, an upper chuck may be adapted to receive or support the bullet end of the round. The component-contacting ends may be spring-loaded, allowing a round or component thereof to be easily and quickly snapped into position. Even if a user requires custom adapters for particular part geometries, these are easily machined and relatively inexpensive.

Figure 7:
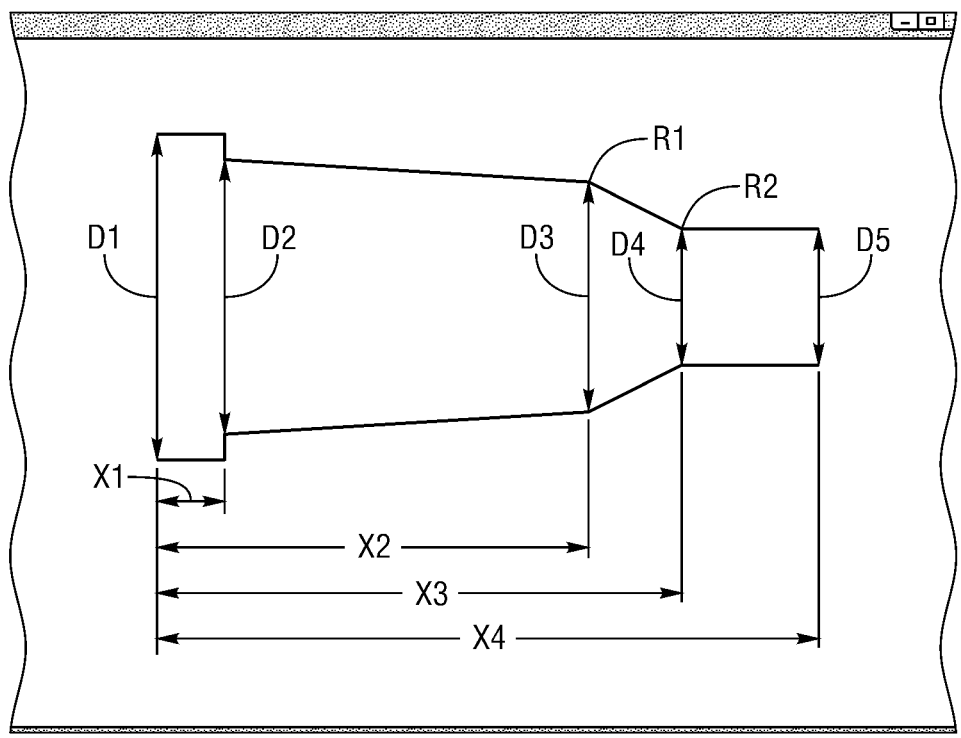
FIG. 7 is a diagram formed on a display of any one of the subsystems, partially broken away, and illustrating a sample virtual gauge which is represented by an array of numerical values (i.e. position, diameter, radius)
Figure 8:
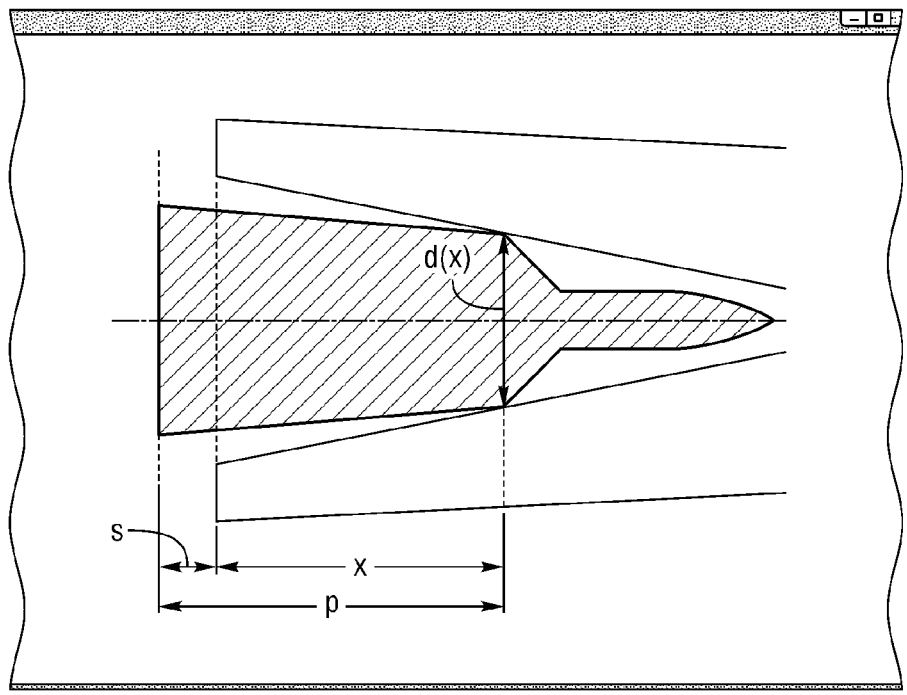
FIG. 8 is a schematic view of a round of ammunition in cross-section formed on the display, partially broken away, and about which a virtual gauge is fitted; the difference between the positions or lengths x and p along the round axis is a gauge shift, s.
Figure 9:
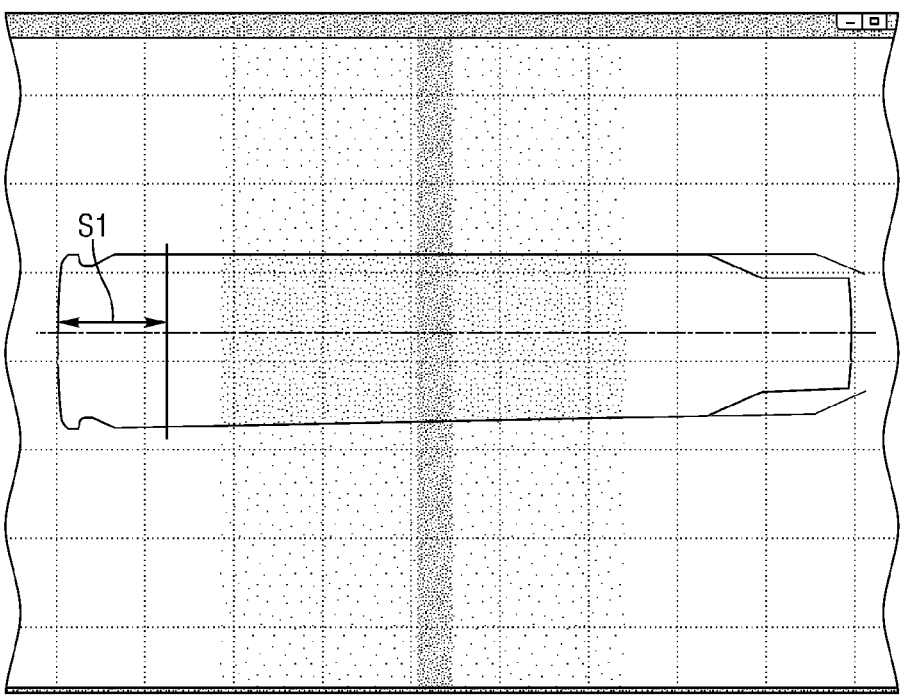
FIG. 9 is a graph formed on a display, partially broken away, and illustrating the outline of a cartridge case and the inner bore of a virtual gauge; the heavier vertical band represents a range of acceptable head space values where a center vertical line of the band is an interference position between the case and the gauge; the case extends from the gauge a measured amount, S1.

With reference to FIGS. 7-9, a "full form feature" is now described.

Introduction

"Full form" is generally a feature of software running on a computer such as a PC. It is intended to inspect a part for maximum material, like one would do mechanically by testing whether a cylindrical symmetrical gauge would fit around a part (a go-gauge). In order for this to work, the inside of the gauge should be cylindrical or tapered, so that the inside diameter decreases along the part. The input data, the algorithm that is used to inspect the inputs, and the resulting value are described hereinbelow.

Input Data

Sensor Data

As described in each of the embodiments of the invention above, the diameter of a part can be obtained by using a laser projecting a thin sheet of light on the part and measuring the size of the shadow it casts. By sampling the diameter at high speed, and moving the part or the laser(s) along the axis of the part, an outline of the part can be formed.

To improve accuracy and to measure complex features, one can use multiple lasers, each providing a view at a different angle to the part as shown in FIG. 4. The laser inspection software therein uses four lasers, with each view separated by 45 degrees. In addition, the sensor that measures diameter is split, so instead of a single diameter it gives a positive and a negative radius.

The result of the sampling is a number (one for each view) of arrays of tuples containing time and the measured radii. The software translates the timing data to position along the part axis by using the velocity and acceleration of the part. In the current configuration of FIG. 6, the positions are spaced between 15 and 25 microns. They are not equally spaced since the part is accelerating.

A calibration table may be used to translate the acquired radii values to millimeters.

After the pre-processing step, each feature inspection is given a number (one for each view) of arrays of tuples (position-along-axis, left radius, right radius).

Gauge Profile

By means of a configuration text file, the user can define the shape and dimensions of a virtual headspace gauge as shown in FIG. 7. Obviously, other types of virtual gauges are also possible. The shape of the headspace gauge is expressed as a polygon, where each vertex is described by a position along the part (x1, x2, x3, x4) and the corresponding diameter (D1, D2, D3, D4 and D5). Besides the vertices, the user can also specify a rounding radius (R1, R2) at each point. Since the gauge is to check maximum material condition, radius is either a maximum or minimum value, depending on the direction of the intersection. To the software, the gauge is presented as an array of tuples of (position, diameter, radius).

Algorithm

For each of the views about the parts, the processing of the input array of (position, radii) data is as follows:

Rotation

In the view the part can look slightly rotated. Since the part is measured vertically, the rotation will cause the diameter values to appear larger than reality and the positions to look closer together. The total length of the part will increase with rotation. Elementary trigonometry shows that the factor from measured to real diameter is the cosine of the rotation angle; for positions it is the reciprocal of it.

To measure the rotation angle, the array of data is sliced to a user specified measurement interval. This interval should be cylinder or cone shaped. For each point in the array, the radius from the left sensor and right sensor are subtracted and divided by two to find the centerpoint. Then, a line is fit through this set of points using a least sum of squared errors method. The (arc-tangent) of the slope of the line is the rotation angle.

Diameter

For each point in the array of (position, left radius, right radius), the two radii are added and multiplied with a factor mentioned above to correct for rotation. Subsequently, the diameter data is filtered with a moving average filter to smooth out the line and make the measurement more robust and precise. The position of the entries in the array is divided by the compensation factor. The result is an array of (position, diameter) values.

Referring now to FIG. 8, for each point in the array the diameter is translated to the minimum location the gauge can have to accommodate this diameter. The difference between the position on the part and this location is the amount the left side of the gauge needs to shift with respect to the left side of the part. This results in an array of minimum shifts necessary. The final result for this view is obtained by calculating the maximum of this array. This shift, s, is the minimum necessary so that the part and gauge will touch in exactly one point.

Result

The result is a single value, S1, that indicates the distance from the start of the part to the start of the gauge, as shown in FIG. 9. When there are multiple views of the part, the result is the maximum of all views.

If the distance is positive, then the value, S1, is the amount the part extends from the gauge. If the result is negative, then the value, S1, is the distance the part is inserted into the gauge. A small positive value is possible when the gauge actually fits, since the measured length of the part may be larger due to its rotation with respect to the scan-axis.

As with every nominal geometric or characteristic feature the user can set a minimum and/or maximum tolerance. If the measured value is outside of the tolerance range (i.e. the vertical band in FIG. 9), the feature result is reported, such as by a signal, as failed.

In view of the above and in summary, a method and system for optically inspecting manufactured rounds of ammunition or cylindrical components of the rounds to obtain rounds which exhibit superior accuracy when fired have been described. The method includes providing a nominal numerical value and an acceptable range of numerical values for a size or a geometric characteristic of an acceptable manufactured round of ammunition or a cylindrical component of the round for a predetermined caliber of ammunition. The method also includes providing a high-performance range of numerical values for the corresponding size or geometric characteristic of a high-performance manufactured round of ammunition or a cylindrical component of the high-performance round. These steps may be performed via a database or memory of one of the systems described above. Alternatively, the step may be performed over a computer network, such as the Internet.

The method further includes optically gauging the size or geometric characteristic of a manufactured round of ammunition or cylindrical component of the round for the predetermined caliber at a vision station to obtain a measured value for the corresponding size or characteristic. This step may be performed by one of the above described systems or subsystems. The method still further includes determining whether the measured value is within the high-performance range. Typically, this step is performed via software running on one or more computers of the above described subsystems. The method further includes generating a signal if the measured value is within the high-performance range. The signal may be transmitted to a user interface on a monitor or may be transmitted to a part sorter for sorting parts. The signal identifies the inspected round or a round including the inspected cylindrical component as having superior accuracy when fired relative to acceptable inspected rounds or inspected cylindrical components having a corresponding measured value which is outside the high-performance range but within the acceptable range of numerical values.

The high-performance range may be at least partially included within the acceptable range.

The size may be overall length (OAL) of the round and/or the size may be headspace of the round.

The geometric characteristic may be concentricity of a projectile of the round with respect to a case body of a cartridge holding the projectile or the geometric characteristic may be runout.

The nominal numerical value and acceptable range of numerical values may be standardized, such as by SAAMI or NATO.

The method may further include transferring the inspected round or inspected cylindrical component from the vision station to a high-performance round or cylindrical component area based on the signal. The step of transferring may be accomplished manually or automatically, such as by an air blow-off actuator or other sorter or actuator.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of optically inspecting manufactured rounds of ammunition or cylindrical components of the rounds to obtain rounds which exhibit superior accuracy when fired, the method comprising:

providing a nominal numerical value and an acceptable range of numerical values for a size or a geometric characteristic of an acceptable manufactured round of ammunition or a cylindrical component of the round and a high-performance range of numerical values for the corresponding size or geometric characteristic of a high-performance manufactured round of ammunition or a cylindrical component of the high-performance round for a predetermined caliber of ammunition;

optically gauging the size or geometric characteristic of a manufactured round of ammunition or cylindrical component of the round for the predetermined caliber at a vision station to obtain a measured value for the corresponding size or characteristic;

determining whether the measured value is within the high-performance range of numerical values; and generating a signal if the measured value is within the high-performance range, the signal identifying the inspected round or a round including the inspected cylindrical component as having superior accuracy when fired relative to acceptable inspected rounds or inspected cylindrical components having a corresponding measured value which is outside the high-performance range but within the acceptable range of numerical values.

2. The method as claimed in claim 1, wherein the high-performance range is at least partially included within the acceptable range.

3. The method as claimed in claim 1, wherein the size is overall length (OAL) of the round.

4. The method as claimed in claim 1, wherein the size is headspace of the round.

5. The method as claimed in claim 1, wherein the geometric characteristic is concentricity of a projectile of the round with respect to a case body of a cartridge holding the projectile.

6. The method as claimed in claim 1, wherein the geometric characteristic is runout.

7. The method as claimed in claim 1, wherein the nominal numerical value and acceptable range of numerical values are standardized.

8. The method as claimed in claim 7, wherein the nominal numerical value and the acceptable range of numerical values are standardized by SAAMI or NATO.

9. The method as claimed in claim 1, further comprising transferring the inspected round or inspected cylindrical component from the vision station to a high-performance round or cylindrical component area based on the signal.

10. A system for optically inspecting manufactured rounds of ammunition or cylindrical components of the rounds to obtain rounds which exhibit superior accuracy when fired, the system comprising:

a control subsystem including storage to store a nominal numerical value and an acceptable range of numerical values for a size or a geometric characteristic of an acceptable manufactured round of ammunition or a cylindrical component of the round and a high-performance range of numerical values for the corresponding size or geometric characteristic of a high-performance manufactured round of ammunition or a cylindrical component of the high-performance round for a predetermined caliber of ammunition; and an optical subsystem configured to:

optically gauge the size or geometric characteristic of a manufactured round of ammunition or cylindrical component of the round for the predetermined caliber at a vision station to obtain a measured value for the corresponding size or characteristic;

wherein the control subsystem is configured to determine whether the measured value is within the high-performance range of numerical values; and wherein the control subsystem is configured to generate a signal if the measured value is within the high-performance range, the signal identifying the inspected round or a round including the inspected cylindrical component as having superior accuracy when fired relative to acceptable inspected rounds or inspected cylindrical components having a corresponding measured value which is outside the high-performance range but within the acceptable range of numerical values.

11. The system as claimed in claim 10, wherein the high-performance range is at least partially included within the acceptable range.

12. The system as claimed in claim 10, wherein the size is overall length (OAL) of the round.

13. The system as claimed in claim 10, wherein the size is headspace of the round.

14. The system as claimed in claim 10, wherein the geometric characteristic is concentricity of a projectile of the round with respect to a case body of a cartridge holding the projectile.

15. The system as claimed in claim 10, wherein the geometric characteristic is runout.

16. The system as claimed in claim 10, wherein the nominal numerical value and acceptable range of numerical values are standardized.

17. The system as claimed in claim 16, wherein the nominal numerical value and the acceptable range of numerical values are standardized by SAAMI or NATO.

18. The system as claimed in claim 10, further comprising a mechanism to transfer the inspected round or inspected cylindrical component from the vision station to a high-performance round or cylindrical component area based on the signal.

* * * * *